(12) United States Patent
Fan et al.

(10) Patent No.: US 8,830,533 B2
(45) Date of Patent: Sep. 9, 2014

(54) SYSTEM AND METHOD FOR CREATING MACHINE-READABLE CODES IN COMBINATION WITH OTHER IMAGES SUCH AS LOGOS

(75) Inventors: Zhigang Fan, Webster, NY (US);
Yonghui Zhao, Penfield, NY (US);
Shen-Ge Wang, Fairport, NY (US);
Hengzhou Ding, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 118 days.

(21) Appl. No.: 13/552,162

(22) Filed: Jul. 18, 2012

(65) Prior Publication Data
US 2013/0215473 A1 Aug. 22, 2013

Related U.S. Application Data

(60) Provisional application No. 61/599,534, filed on Feb. 16, 2012.

(51) Int. Cl.
*H04N 1/40* (2006.01)

(52) U.S. Cl.
USPC .......................................... 358/3.28; 345/589

(58) Field of Classification Search
CPC ................... G06K 19/06103; G06K 19/06159
See application file for complete search history.

(56) References Cited

U.S. PATENT DOCUMENTS

| | | | |
|---|---|---|---|
| 2011/0038012 A1* | 2/2011 | Massicot et al. | 358/3.28 |
| 2011/0154174 A1* | 6/2011 | Liu et al. | 715/205 |
| 2013/0021364 A1* | 1/2013 | Azuma et al. | 345/589 |

* cited by examiner

*Primary Examiner* — Barbara Reinier
*Assistant Examiner* — Christopher D Wait
(74) *Attorney, Agent, or Firm* — Fox Rothschild LLP

(57) ABSTRACT

A process for creating a barcode with an embedded logo considers a printer gamut and divides the printer gamut into multiple regions. A virtual printer gamut is then generated with the colors in bright and dark regions. A target logo image is generated by mapping the virtual gamut to the original logo image. A logo with embedded barcode is produced using the colors specified in the target logo image.

17 Claims, 6 Drawing Sheets
(2 of 6 Drawing Sheet(s) Filed in Color)

SYSTEM AND METHOD FOR CREATING MACHINE-READABLE CODES IN COMBINATION WITH OTHER IMAGES SUCH AS LOGOS

RELATED APPLICATIONS

This application hereby claims priority under 35 U.S.C. §119 to U.S. Provisional Patent Application No. 61/599,534 filed 16 Feb. 2012, entitled "SYSTEM FOR CREATING MACHINE-READABLE CODES IN COMBINATION WITH OTHER IMAGES SUCH AS LOGOS," the disclosure of which is incorporated herein by reference.

This application is related to U.S. patent application Ser. No. 13/552,170, filed Jul. 18, 2012, now U.S. Pat. No. 8,550,367, issued Oct. 8, 2013, titled SYSTEM AND METHOD FOR EMBEDDING MACHINE-READABLE CODES IN COMBINATION WITH OTHER IMAGES SUCH AS LOGOS; and U.S. patent application Ser. No. 13/552,177, filed Jul. 18, 2012, titled SYSTEM AND METHOD FOR EMBEDDING MACHINE-READABLE CODES IN A DOCUMENT BACKGROUND.

BACKGROUND

Symbologies, such as matrix symbologies and two-dimensional barcodes, have become a widely accepted tool for sharing small amounts of data, and for tracking objects that are marked with the symbology. Examples of symbologies include Universal Product Codes (UPC), data matrix codes, Quick Response (QR) codes, Aztec codes, Maxi codes, and the like.

A symbology may be scanned and read by a wide variety of devices, including, but not limited to, cellular telephones, digital cameras, smartphones, personal digital assistants, tablet devices, electronic readers, personal computers and portable satellite navigation devices. The generation of the various symbologies are governed by established international standards, e.g. ISO/IEC 18004:2006 covering QR codes.

QR codes have become a widely accepted method for printing mechanically readable encoded data. The codes can be used in official documents such as certificates and diplomas to verify the authenticity. For example, assigning a unique QR code to an official document and tying authentication data to the code allows for the validation of the document.

The barcodes are typically printed as an independent entity in the page, separated from other objects such as pictures, text, graphics, and logos. However, it is sometimes desirable to have QR codes embedded in other objects, such as logos and seals, to make the document aesthetically more appealing. Color QR barcodes have been designed to mimic simple logo type graphics, which can be found in many websites. Typically, graphical information is combined with the barcode in a "naive approach".

There are several disadvantages for the naive approach. First, it can not ensure the symbol contrast and hence the readability of the resulting barcode. Second, the method cannot ensure sufficient image quality, particularly in color saturation. Third, it may result in "brightness reversal" where a brighter color becomes much darker after barcode embedding and vice versa. Therefore a need exists for a method to combine a logo with a barcode that avoids these disadvantages.

SUMMARY

A method and system for creating a barcode embedded logo are disclosed. The method includes dividing a printer gamut into three reflectance regions using a reflectance threshold and a predetermined minimum symbol contrast. A virtual gamut is generated that contains colors from a first and a second reflectance region based on an original logo image. A target logo image is generated by mapping the virtual gamut to the original logo image. An embedded logo with an embedded barcode is produced using colors specified in the target logo image.

In another aspect, an electronic device includes a processor and a computer-readable memory containing a barcode image embedding application. The application contains programming instructions that instruct the processor to divide a printer gamut into three reflectance regions using a reflectance threshold and a predetermined minimum symbol contrast. The program instructions also instruct the processor to generate a virtual gamut with colors from a first and a second reflectance region based on an original logo image. A target logo image is generated by mapping the virtual gamut to the original logo image. An embedded logo with an embedded barcode is produced using colors specified in the target logo image.

In another aspect, a computer program product contains a set of instructions that, when executed, instruct a processor of an electronic device to implement a method. The method includes dividing the printer gamut into three reflectance regions, a bright region, a dark region, and a middle region, using a reflectance threshold and a predetermined minimum barcode contrast. The method also includes generating a virtual printer gamut with colors in the bright and dark regions based on an original logo image. A target logo image is generated by mapping the virtual gamut to the original logo image. A logo with an embedded barcode is produced using colors specified in the target logo image.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
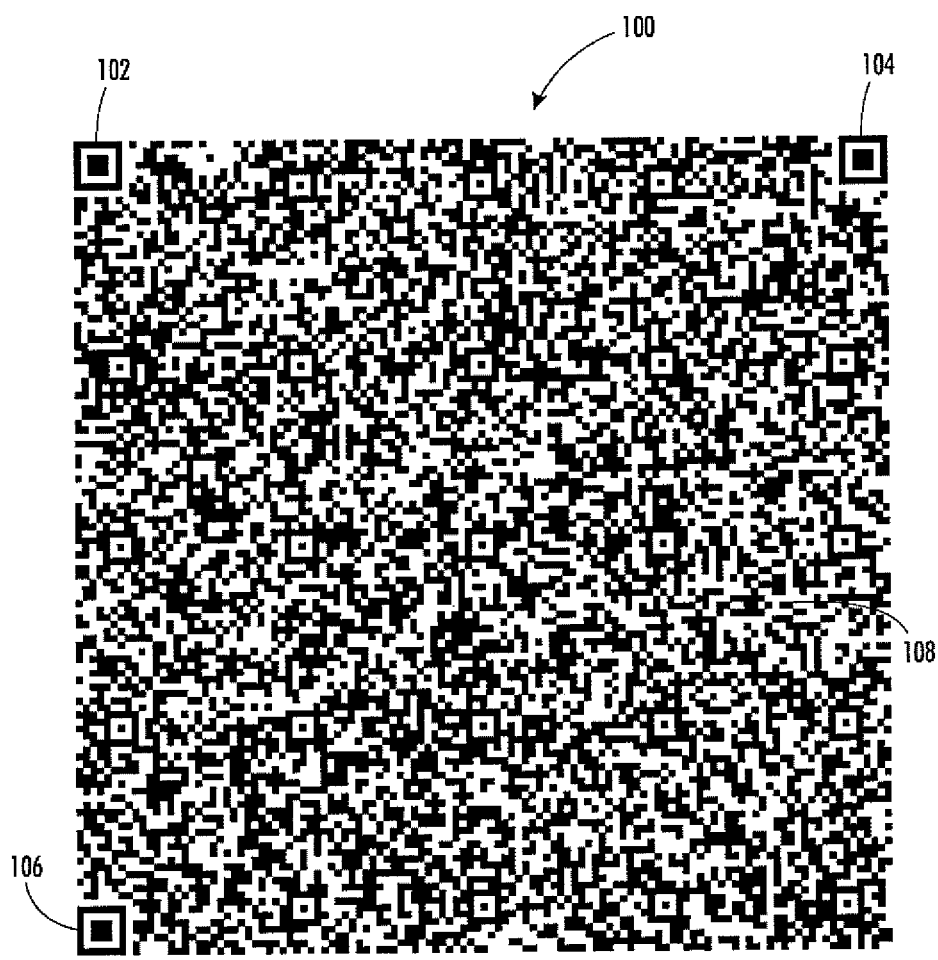
FIG. 1 is an illustration of one embodiment of a barcode in accordance with an aspect of the present disclosure.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The term "data" may refer to physical signals that indicate or include information. A "data bit" may refer to a single unit of data. An "image," as a pattern of physical light or a collection of data representing the physical light, may include characters, words, symbologies, graphics and other features, as well as combinations thereof. A "digital image" is by extension an image represented by a collection of digital data. A "logo" refers to one or more graphical elements and/or any combination thereof.

A "barcode" is a pattern or symbol that that is displayed on a surface and which represents data. Barcodes may be an optical, machine-readable representation of data. Barcodes may include, without limitation, one-dimensional symbologies, two-dimensional (2D) symbologies, or three-dimensional symbologies. Examples of two-dimensional barcodes include data matrix codes, quick response codes, Aztec codes, Maxi codes and the like. The barcodes may be displayed on an electronic display, and may be of any geometric shape or size. In this document, the terms "barcode" or "matrix code" may be used in the examples, but the term is intended to include any such symbology. For the purposes of this application, a "copy" of a barcode refers to at least a portion of the barcode sufficient to allow the barcode to be fully read by a machine or scanner.

A "gamut" refers to a subset of colors which can be accurately represented in a particular medium. For example, a "printer gamut" refers to the subset of chromaticities that can be reproduced by a particular printer. An "image gamut" refers to a subset of colors from the printer gamut that are present in a given image produced by the printer. A "virtual gamut" refers to a set of colors calculated from the average reflectance of combined light and dark color pairs that selected from the printer gamut. The term "average" as used herein refers to a value approximately intermediate to two values.

An "electronic device" refers to a device that includes an imaging device, a processor and tangible, computer-readable memory. The memory may contain programming instructions in the form of a software application that, when executed by the processor, causes the device to perform one or more barcode scanning operations according to the programming instructions. Examples of suitable devices include portable electronic devices such as smartphones, personal digital assistants, cameras, tablet devices, electronic readers, personal computers, media players, satellite navigation devices and the like.

Referring to FIG. 1, a quick response (QR) code 100 is shown. In an embodiment, this code is generated according to a standard promulgated by the International Organization for Standards (ISO), e.g. ISO/IEC 18004: 2006. In FIG. 1, a barcode according to an aspect of the present disclosure may be a QR code 100. The matrix code 100 may contain one or more position detection elements 102, 104, 106 and a data portion 108 made of a set of informational elements. Each element may be a pixel or a group of pixels.

Color QR barcodes have been designed to mimic simple logo type graphics, which can be found in many websites. Typically, graphical information is combined with the barcode in a "naive approach". The graphic color is used to replace one of the black and white colors in the barcode, depending on the darkness of the graphic colors. In other words, the colors of a particular logo are used to replace the white background and the black foreground as appropriate. There are several disadvantages for the naive approach. First, it can not ensure the symbol contrast and hence the readability of the resulting barcode. Symbol contrast is an important parameter for measuring code readability. Symbol contrast "Δ" is defined by the following formula.

$$\Delta = R(b) - R(d), \tag{Equation 1}$$

where R(x) is the reflectance of color x.

In one standard, symbol contrast is graded as A, B, C, D and F for the cases $\Delta \geq 0.7$; $\Delta \geq 0.55$; $\Delta \geq 0.4$; $\Delta \geq 0.2$; and $\Delta \geq 0.2$, respectively.

Second, the method cannot guarantee sufficient image quality, particularly in color saturation. Third, it may result in "brightness reversal." For example, a simple logo can comprise a square where one half is colored light yellow and the other half is colored dark blue. To maintain a required symbol contrast when embedding a barcode, the white background portions of the barcode would be replaced with the bright logo color yellow. The black foreground portions of the barcode would be replaced by the dark logo color blue. As one of skill in the art will recognize, the black foreground pattern embedded on the yellow background of the logo would dominates the yellow of the image. On the other hand, the blue color would be washed out by the addition of the white background pattern of the embedded barcode. Therefore, the bright yellow portion of the logo would be much darker and the once dark blue portion of the barcode will be much brighter.

Figure 2:
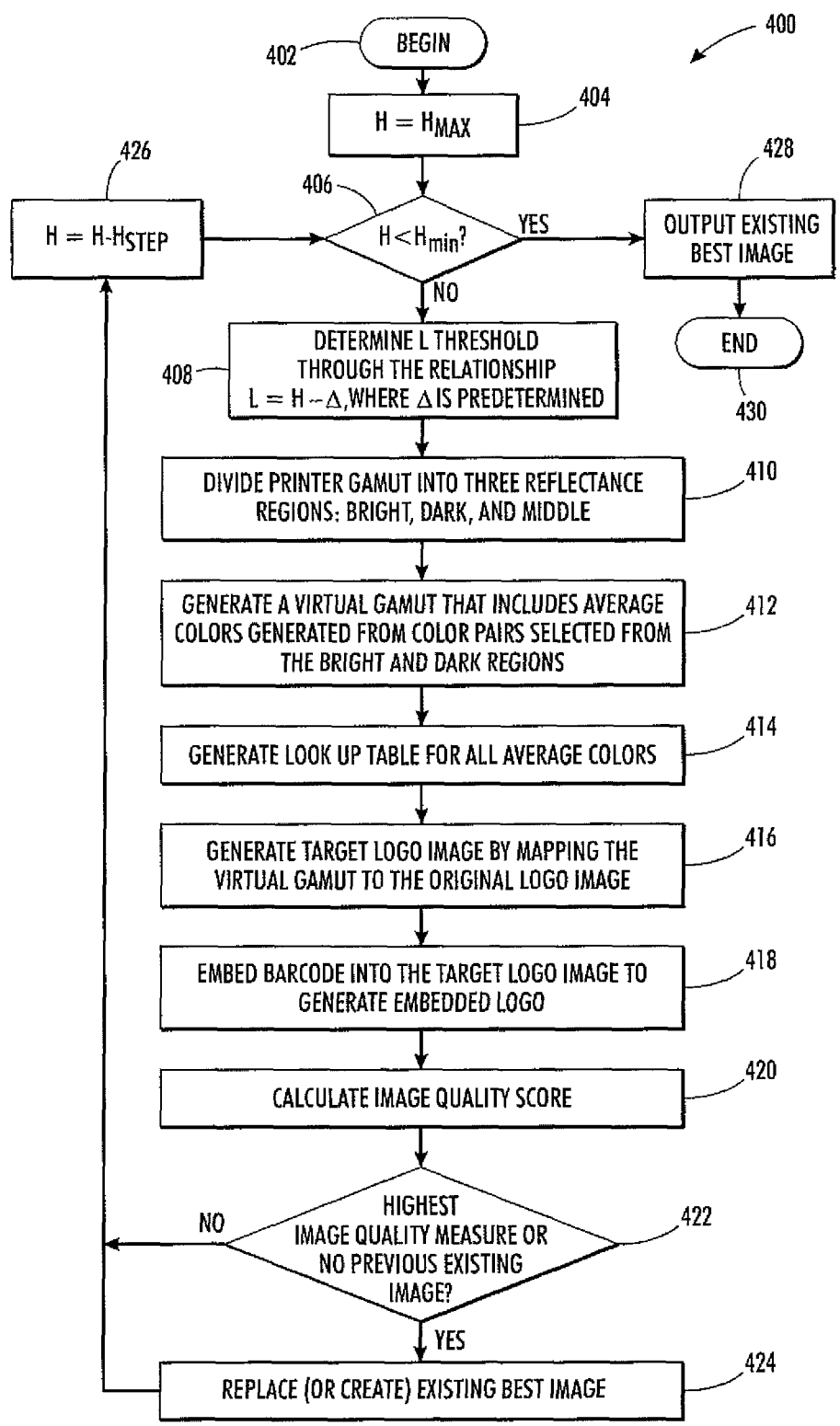
FIG. 2 is a flowchart summarizing an image processing method in accordance with an aspect of the present disclosure.

A method for embedding a QR code into a logo type graphical element is presented in FIG. 2. The method is compatible with the standard and current barcode decoding technologies. Specifically, the resulting barcodes are readable by standard decoders, including both laser and imaging readers. Although the method is focused on the QR code, it is extensible to other symbologies.

Referring to FIG. 2, a flow chart is provided that illustrates a process 400 for creating an embedded logo in accordance with an embodiment of the present disclosure. The process 400 approaches the logo embedding problem as an image quality optimization procedure that begins at step 402. The optimization is implemented as a double loop. In the outer loop, an upper reflectance threshold H is varied. The process assumes that predetermined values exist for a maximum upper reflectance threshold $H_{max}$, a minimum reflectance threshold $H_{min}$, and an increment amount $H_{step}$. The process continues to step 404, where a downwardly variable upper reflectance threshold H is set to equal $H_{max}$. At step 406, H is compared to $H_{min}$ to determine if H has been downwardly varied such that H is less than $H_{min}$. During the first iteration of process 400, the decision in step 406 will be no. However, as H is downwardly varied in increments of $H_{step}$ during later iterations, step 406 determines when process 400 ends. On a condition that H is not less than $H_{min}$ (step 406: No), the process continues to step 408.

At step 408, a lower reflectance threshold L is determined through the relationship, based on Equation 1, L=H−Δ, where Δ is a predetermined value corresponding to a minimum required symbol contrast for the barcode. This minimum required symbol contrast is customer determined and/or is specified in one or more international standards. As described above, the symbol contrast ensures that the resulting logo-embedded barcode will still be readable by a standard device. The process continues at step 410 where the printer gamut is divided into three reflectance regions, a bright region (reflectance above H), a dark region (reflectance below L), and a middle region (reflectance between L and H).

The process continues at step 412, where a virtual gamut is created using the three reflectance regions of the printer gamut determined in step 410. In an embodiment, the virtual gamut is created by selecting a color pair, i.e. (b, d). For each pair of (b, d), where b and d are selected from the bright and dark regions, respectively, the combined color c(b, d) is calculated as $$c(b,d)=0.5(b+d).\qquad\text{(Equation 2)}$$

Figure 3A:
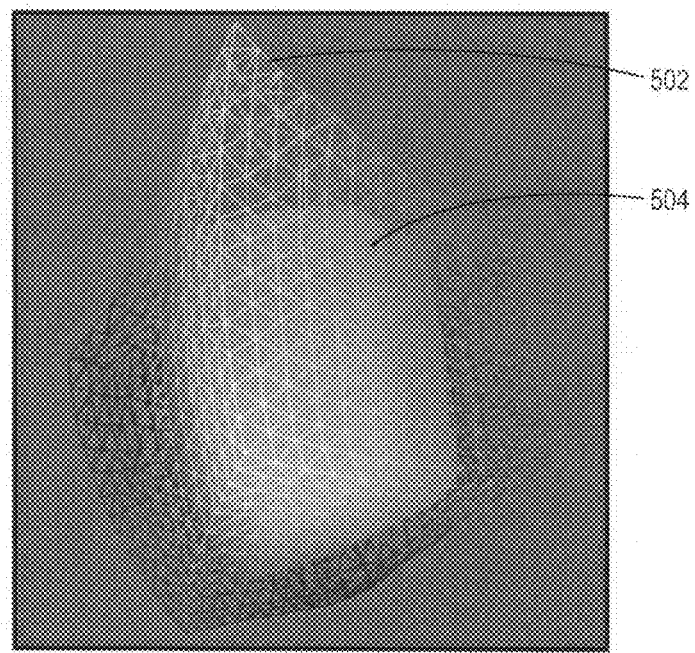
FIGS. 3A-B is an illustration a virtual gamut.
Figure 3B:
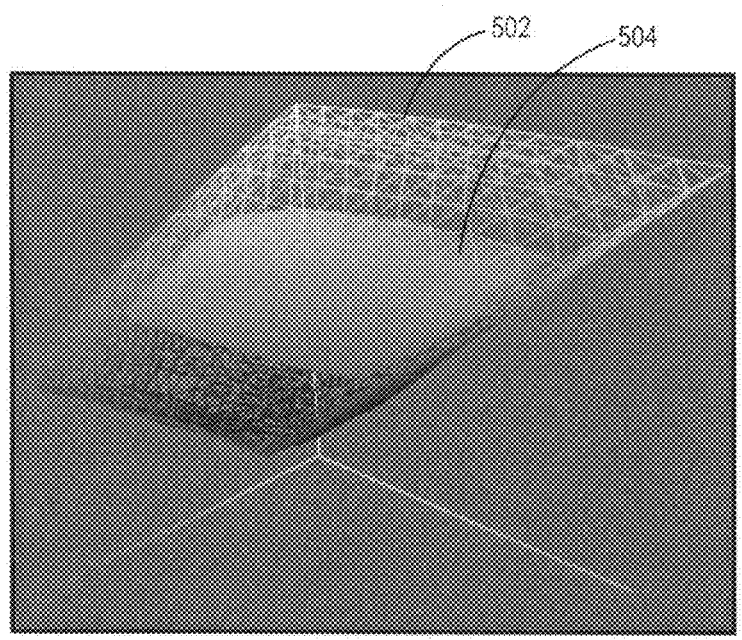
Figure 4A:
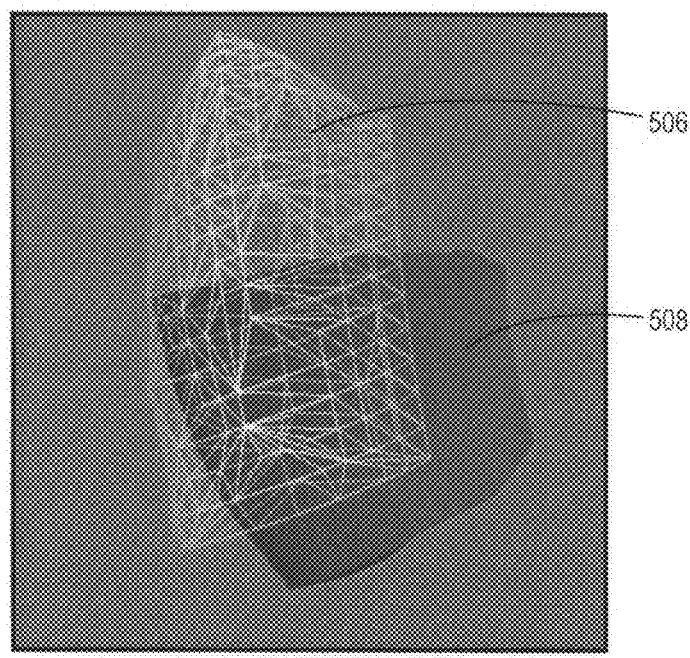
FIGS. 4A-B is an illustration of a set of bright and dark reflectance regions.
Figure 4B:
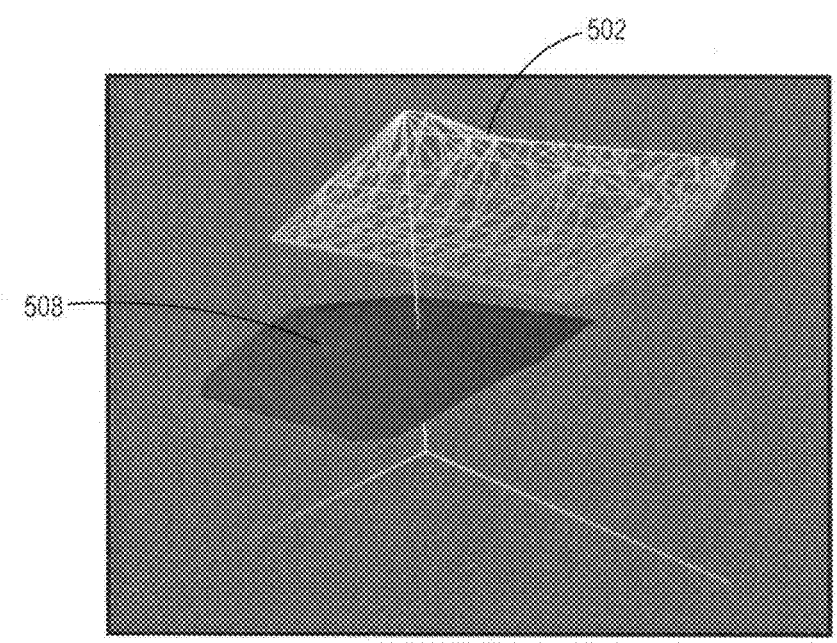

In other words, c(b, d) is an average of the bright and dark colors. This is because for most QR codes, which are printed with a relatively low resolution and contain roughly the same number of dark and bright cells, a mixture color $c_i$ can be reasonably approximated as the average of $b_i$ and $d_i$ (when colors are represented in a linear color space), where i is a color index. A virtual gamut is generated that contains all $c_i(b_i, d_i)$ colors. The virtual gamut represents the ensemble of all perceptive barcode colors when viewed from a distance. This gamut is much smaller than the original printer gamut and contains only its center portion. In other words, it does not include colors that are saturated, e.g. very dark or very bright. An virtual gamut is illustrated in FIGS. 3A and 3B, where the larger wire portion 502 is the printer gamut and the smaller solid portion 504 is the virtual gamut. FIGS. 4A and 4B show the bright region 506 (wired) and the dark region 508 (solid).

After the virtual gamut has been generated, the process continues to step 414 where a look up table is generated for all colors $c_i(b_i, d_i)$. A mapping from a color c(b, d) to colors b and/or d is recorded during the gamut generation in step 412. In an embodiment, the mapping is implemented as a lookup table, using color c as an input and having the corresponding (b, d) color pair as output. Since either b or d can be determined from c using the Equation 2, only one of b and d needs to be stored. The other may be calculated from Equation 2. To generate the lookup table, c(b, d) is first quantized to a node in the lookup table grid, and color b is then recorded for the node. If multiple (b, d) pairs exist for the same node, the pair with the lowest contrast is stored. For the lookup table nodes that do not have any corresponding (b, d) color pairs, their values may be obtained from the gamut, either directly or through interpolation and extrapolation. Methods of interpolation and extrapolation are well known in the art.

Once the mapping lookup table is generated in step 414, the process continues to step 416 where a target logo image is generated by mapping the virtual gamut to the original logo image. In an embodiment, for each reference color $v_i$ in the original logo image, a pair of colors $b_i$ and $d_i$ is selected. For a barcode region that is composed of colors $b_i$ (for bright pixels) and $d_i$ (for dark pixels), when viewing from a distance, the average (perceptive) color $c_i$ would be a mixture of $b_i$ and $d_i$. As a result, $(b_i, d_i)$ color pairs are selected whose average color $c_i$ is the closest to reference color $v_i$ in the logo image, for all i colors. The search is constrained by the formula $R(b_{min})-R(d_{max}) \geq \Delta$, where $b_{min}$ is the darkest color in selected $b_i$ set and $d_{max}$ is the brightest color in the $d_i$ set and R(x) is the reflectance of color x. Therefore, it can be ensured that each color pair (b, d) satisfies $R(b)-R(d) \geq \Delta$, where b and d are picked from the bright and dark regions, respectively. Hence, the predetermined symbol contrast $\Delta$ is maintained.

Although image quality degradation is inevitable since colors between the original logo and the target logo will not exactly match, the mature technologies in gamut mapping can minimize the image quality loss. These algorithms can be implemented in various color spaces, e.g., CIELAB, CIECAM02 or IPT, or with different emphasis, e.g., hue-angle preserving, constant lightness, maximizing saturation or chroma, and the like. In an embodiment, the algorithm used is hue-angle preserving minimum $\Delta Eab$ clipping. However, the embodiments are not limited in this regard and any algorithm suitable for minimizing image quality loss can be used.

Next in step 418, an embedded logo is created by embedding the barcode into the target logo image using the c-to-b lookup table, i.e. identify an average uniform color c as an input to look up color b and calculate color d. For each pixel (x, y) in the target logo image, the color b is obtained from the lookup table from the entry of color c(x, y), where c(x, y) is the pixel color in the target logo. If color c(x, y) is not in the lookup table, any suitable interpolation method is applied. In one embodiment, the barcode pixels are given an embedding value of "0" or "1" depending on whether the pixel is in the background (i.e., bright) or foreground (i.e., dark) respectively. If the embedding value at (x, y) is "0" (bright), the output color for the pixel is b. Otherwise, it is d=2c−b.

Figure 5A:
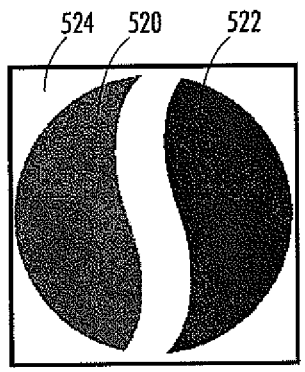
FIG. 5A is an example of a logo to be embedded.
Figure 5B:
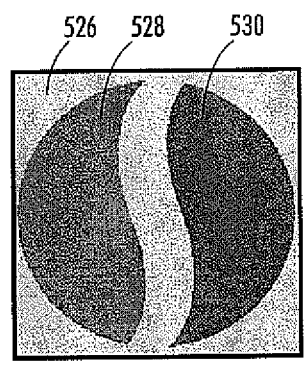
FIG. 5B is an example of a gamut mapped target logo.
Figure 5C:
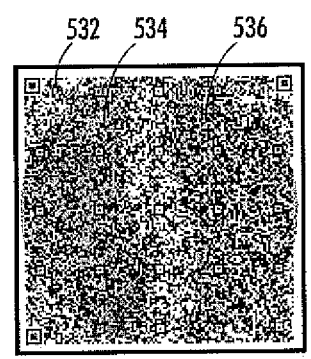
FIG. 5C is an example of a logo embedded with a barcode.

For example, referring to FIG. 5A, a logo image is presented. The logo image comprises a first color region 520, a second color region 522, and a third color region 524. Referring to FIG. 5B, a gamut mapped target logo image is presented. The gamut mapped target logo image also comprises a first color region 526, a second color region 528, and a third color 530. To embed the barcode into the target logo, the color of each color region is identified, e.g. regions 526, 528, and 530. Then the color is input into the look up table to arrive at a color pair. As described above, the color pair comprises a bright color and a dark color that average to the color in the target logo image. After the color pair is determined, the pixels of the barcode are replaced by one color of the corresponding color pairs of the target logo image. A binary embedding value is mapped to the barcode where the white background is assigned a value of "0" while the black foreground is assigned a value of "1." A pixel with an embedding value of 0 is replaced with the bright color of the color pair while a pixel with an embedding value of 1 is replaced with the dark color of the color pair. The result is shown in FIG. 5C, which illustrates an embedded logo image with a first color region 532, a second color region 534, and a third color 536.

After the embedded logo has been created, an image quality score is calculated in step 420. In step 422, the image quality score calculated in step 420 of the new image generated in step 418 is compared with that of the previous existing best image, i.e. the image generated during previous iterations with the highest image quality score. If, the new image is of lesser quality than the existing best image (422: No), the process continues directly to step 426. If the new image generated in step 418 has a higher image quality score than the previous existing best image (422: Yes), the process continues to step 424 where the new image replaces the existing image. If no previous image exists, as would be the case during the first iteration of process 400, then the new image becomes the existing best image in step 424. After the existing best image has been replaced or created, the process continues to step 426.

In step 426, H is incremented using the formula H=H+$H_{step}$. The process then returns to step 406 where it is determined whether H is less than $H_{min}$. If H is less than $H_{min}$ (406: Yes), the optimization process concludes with output of the existing best image in step 428 and the end of the process in step 430. Effectively, process 400 produces a plurality of embedded logos, each produced using a unique value of H. The result of process 400 is an optimized embedded logo that exhibits the highest image quality. The plurality of embedded logos are generated by either upwardly or downwardly varying the threshold H between a maximum and a minimum value. As illustrated, embedded logo image is generated for each threshold H. The perceptive image quality score is calculated and compared against that of the original logo image. The embedded logo image with the highest quality score is selected as the output.

Figure 5D:
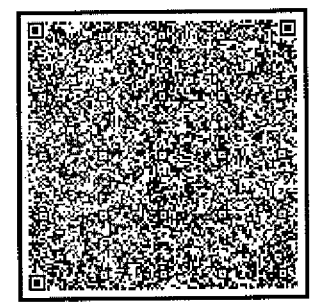
FIG. 5D is an example of a logo embedded with a barcode using the naive approach.

FIG. 5A is a logo image. The barcode to be embedded is that specified in FIG. 1. FIG. 5B a target logo after gamut mapping. FIG. 5C shows the logo with embedded barcode produced from process 400. In comparison, FIG. 5D was generated using the naive approach, illustrating the advantages of process 400. Once generated, the embedded logo may be used in the same way any QR code may be used. For example, the embedded logo may be stored on a computer-readable storage medium. The logo may also be displayed on a screen, such as in a web browser displaying a web page or on a television screen. Likewise, the embedded barcode may be printed onto a surface, such as product packaging or print advertisements. The embodiments of the present disclosure are not limited in this regard.

Figure 6:
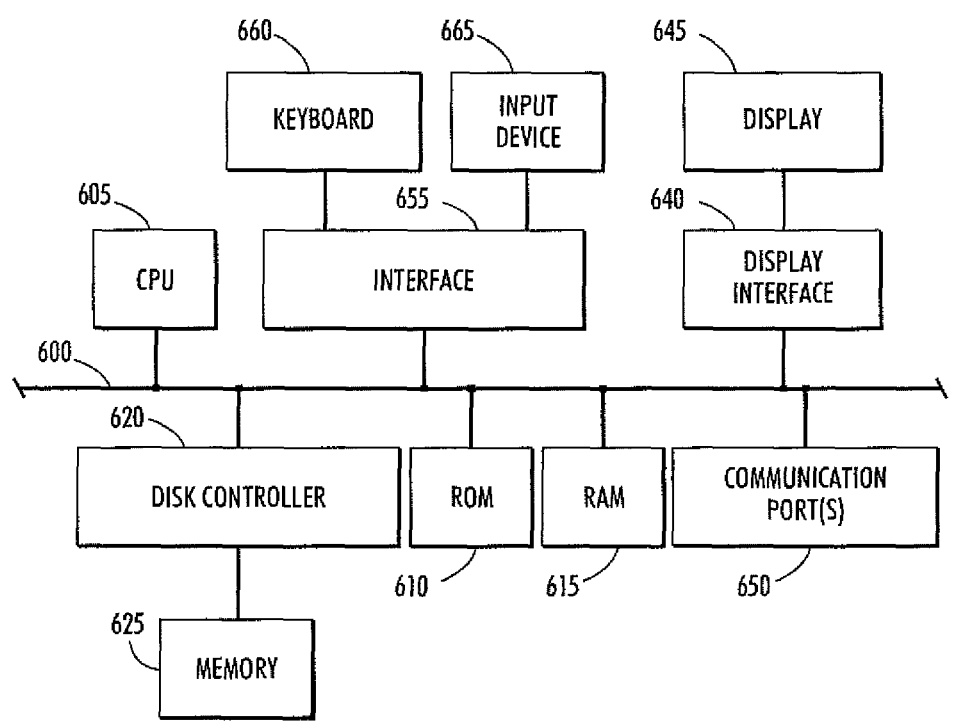
FIG. 6 is a block diagram depicting elements that may be present in an electronic device or a computing device.

FIG. 6 depicts a block diagram of internal hardware that may be used to contain or implement the process discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. A communication port 650 may be attached to a communications network, such as the Internet or an local area network.

The hardware may also include an interface 655 which allows for receipt of data from input devices such as a keyboard 660 or other input device such as a mouse 665, a joystick, a touch screen, a remote control, a pointing device, a video input device and/or an audio input device.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of creating a barcode embedded logo, comprising:
   dividing a printer gamut into a bright reflectance region, a dark reflectance region, and a middle reflectance region using a reflectance threshold and a predetermined minimum symbol contrast;
   generating a virtual gamut with colors from the bright and dark reflectance regions based on an original logo image by:
      selecting a color pair that comprises a first color from the bright reflectance region of the printer gamut and a second color from the dark reflectance region of the printer gamut; and
      calculating an average color by averaging the first and second colors of the color pair;
   generating a target logo image by:
      identifying a reference color in the original logo image;
      selecting an average color from the virtual gamut that most closely matches the reference color; and
      replacing each reference color in the original image with a corresponding average color; and
   producing an embedded logo with an embedded barcode using colors specified in the target logo image.

2. The method of claim 1, further comprising:
   producing a plurality of embedded logos by varying the reflectance threshold by a discreet amount and repeating the dividing, generating, and gamut mapping steps for each different reflectance threshold value;
   calculating an image quality score for each of the plurality of embedded logos; and
   selecting a selected embedded logo with a highest image quality score.

3. The method of claim 2, further comprising at least one of:
   displaying the selected embedded logo on a display connected to the electronic device;
   storing the selected embedded logo in a computer-readable memory connected to the electronic device; and
   printing the selected embedded logo by a printer connected to the electronic device.

4. The method of claim 2, wherein an upper reflectance threshold is downwardly varied from a maximum upper reflectance threshold to a minimum upper reflectance threshold.

5. The method of claim 2, wherein a lower reflectance threshold is upwardly varied from a minimum lower reflectance threshold to a maximum lower reflectance threshold.

6. The method of claim 1, wherein creating the virtual gamut further comprises:
   generating a table that that relates the average color for each color pair and at least one of the first and second colors of the color pair that comprise the average color.

7. The method of claim 6, wherein producing a logo with an embedded barcode further comprises:
   identifying a plurality of logo regions in the target logo image that comprise a uniform average color;
   generating a color pair for each logo region in the target logo image by searching the table based on the uniform average color; and
   replacing each of the plurality of logo regions with a barcode region comprising the first and second colors of the generated color pair that correspond to the average color.

8. The method of claim 7, wherein a difference in reflectance for the first and second colors in the color pair for each average color in the virtual gamut is greater or equal to a predetermined minimum symbol contrast.

9. The method according to claim 1, wherein the barcode is one of a data matrix code, a universal product code, a quick response code, an Aztec code, and a MaxiCode.

10. An electronic device, comprising:
a processor; and
a computer-readable memory containing a barcode image embedding application comprising programming instructions that instruct the processor to:
divide a printer gamut into a bright reflectance region, a dark reflectance region, and a middle reflectance region using a reflectance threshold and a predetermined minimum symbol contrast;
generate a virtual gamut with colors from the bright and dark reflectance regions based on an original logo image by
selecting a color pair that comprises a first color from the bright region of the printer gamut and a second color from the dark region of the printer gamut; and
calculating an average color by averaging the first and second colors of the color pair;
generate a target logo image by:
identifying a reference color in the original logo image;
selecting an average color from the virtual gamut that most closely matches the reference color; and
replacing each reference color in the original image with a corresponding average color; and
produce an embedded logo with an embedded barcode using colors specified in the target logo image.

11. The electronic device of claim 10, wherein the computer-readable memory further includes programming instructions to instruct the processor to:
produce a plurality of embedded logos by varying the reflectance threshold by a discreet amount and repeating the dividing, generating, and gamut mapping steps for each different reflectance threshold value;
calculate an image quality score for each of the plurality of embedded logos; and
select a selected embedded logo with a highest image quality score.

12. The electronic device of claim 11, wherein the computer-readable memory further includes programming instructions to instruct the processor to:
generate a table that that relates the average color for each color pair and at least one of the first and second colors of the color pair that comprise the average color.

13. The electronic device of claim 12, wherein the computer-readable memory further includes programming instructions to instruct the processor to:
define a plurality of logo regions that comprise a single average color;
generate a color pair for each average color in the target logo image by searching the table; and
replace each of the plurality of logo regions with a barcode region comprising the first and second colors of the generated color pair that correspond to the average color.

14. A computer program product containing a set of instructions that, when executed, instruct a processor of an electronic device to implement a method, wherein the electronic device includes, a processor and a non-transitory computer-readable memory, the method comprising:
dividing the printer gamut into three reflectance regions, a bright region, a dark region, and a middle region, using a reflectance threshold and a predetermined minimum barcode contrast;
generating a virtual printer gamut with colors in the bright and dark regions based on an original logo image by:
selecting a color pair that comprises a first color from the bright region of the printer gamut and a second color from the dark region of the printer gamut; and
calculating an average color by averaging the first and second colors of the color pair;
generating a target logo image by:
identifying a reference color in the original logo image;
selecting an average color that most closely matches the reference color; and
replacing each reference color in the original image with a corresponding average color; and
producing a logo with an embedded barcode using colors specified in the target logo image.

15. The computer program product of claim 14, wherein the method further comprises:
producing a plurality of logos with an embedded barcode by varying the reflectance threshold and repeating the dividing, generating, and gamut mapping steps for each different reflectance threshold value;
measuring an image quality score for each of the plurality of logos with an embedded barcode; and
selecting for printing a logo with an embedded barcode with a highest image quality score.

16. The computer program product of claim 15, wherein the method further comprises:
generating a table that that relates the average color for each color pair and at least one of the first and second colors of the color pair that comprise the average color.

17. The computer program product of claim 16, wherein the method further comprises:
defining a plurality of logo regions that comprise a single average color;
generating a color pair for each average color in the target logo image by searching the table; and
replacing each of the plurality of logo regions with a barcode region comprising the first and second colors of the generated color pair that correspond to the average color.

* * * * *